United States Patent

Ross

[15] 3,669,240
[45] June 13, 1972

[54] METHOD AND APPARATUS FOR ORIENTING ARTICLES

[72] Inventor: Edward E. Ross, San Rafael, Calif.

[73] Assignee: Del Monte Corporation, San Francisco, Calif.

[22] Filed: Feb. 18, 1971

[21] Appl. No.: 116,525

[52] U.S. Cl............................................198/31 AA, 146/84
[51] Int. Cl.......................................................B65g 47/26
[58] Field of Search..............198/30, 31 AA, 33 AA, 33 AD; 146/84

[56] References Cited

UNITED STATES PATENTS 3,386,560   6/1968   Ross..................................198/31 AA

*Primary Examiner*—Edward A. Sroka
*Attorney*—Flehr, Hohbach, Test, Albritton & Herbert

[57] ABSTRACT

Method and apparatus for lengthwise orientation of elongated tapered articles. Articles of random lengthwise orientation are moved along a path over a surface having an upstanding ridge extending diagonally across the path. Conveyor means are provided to move the articles relative to the surface so that the articles spin about their longitudinal axes and migrate to a side of the surface in a direction toward their small ends where they are collected together in common orientation for conveyance to further processing steps.

13 Claims, 4 Drawing Figures

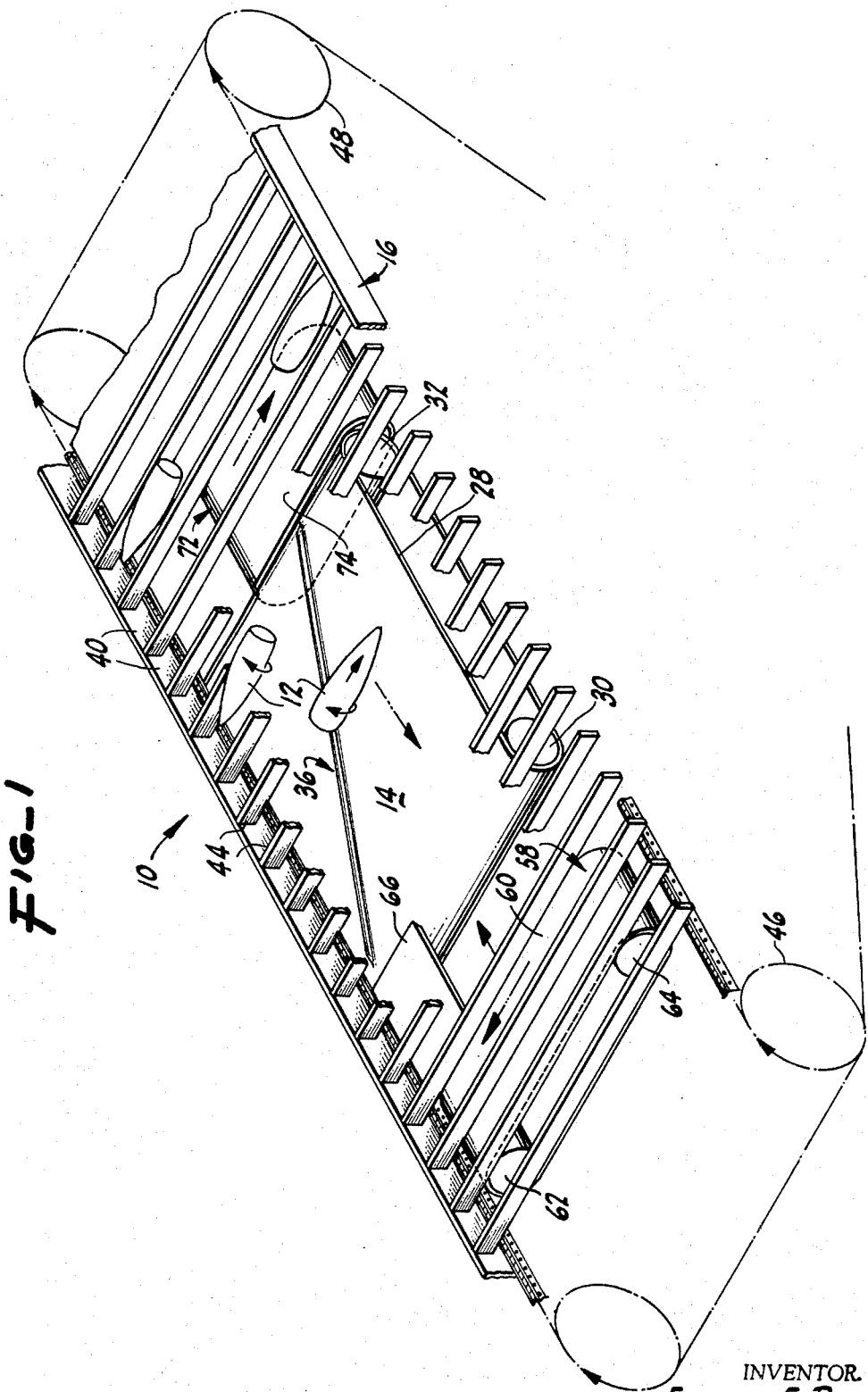

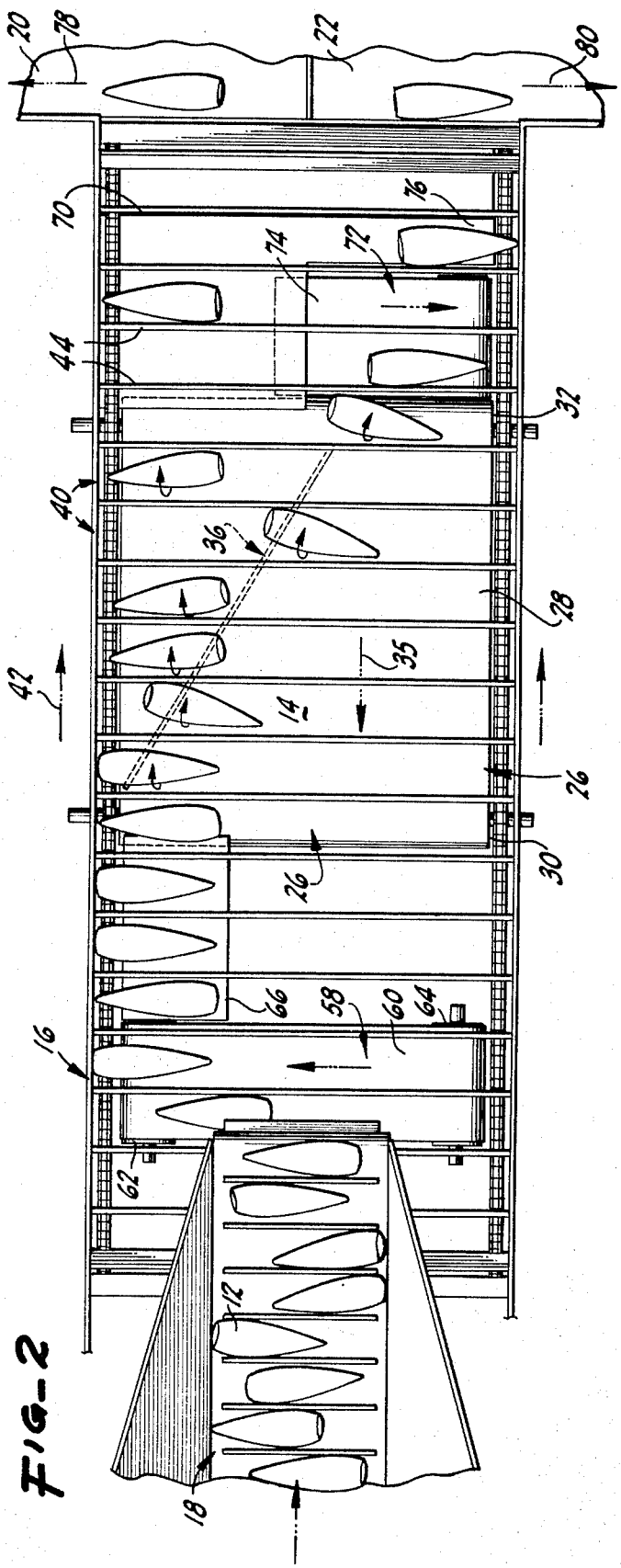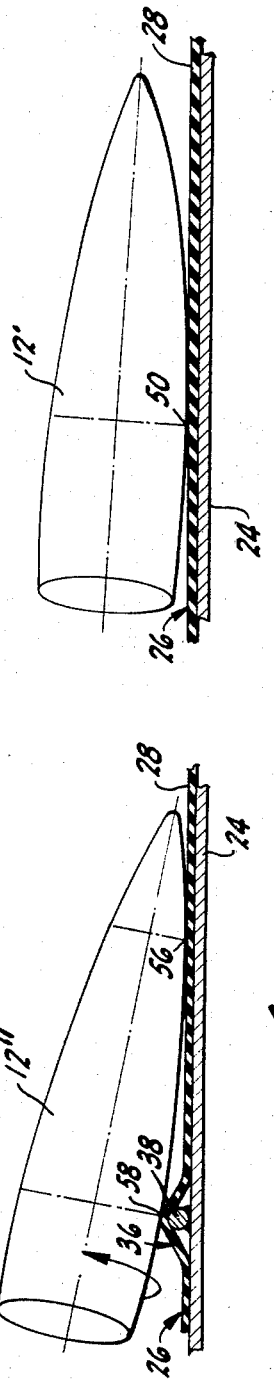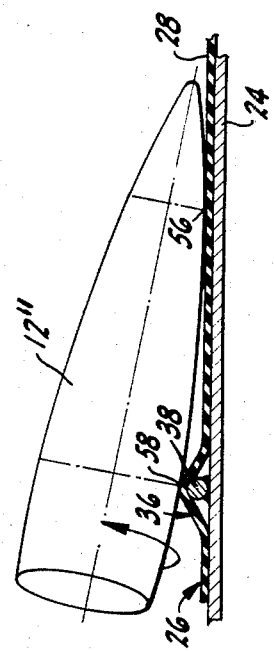

METHOD AND APPARATUS FOR ORIENTING ARTICLES

BACKGROUND OF THE INVENTION

This invention relates generally to method and apparatus for handling elongated tapered articles and more particularly relates to method and apparatus for orienting elongated tapered agricultural products such as corn, carrots, pineapples and the like.

In the handling and processing of elongated tapered agricultural products orienting operations may be required so that the articles in the processing stream are caused to have a common lengthwise orientation. For example, it is desirable to feed ears of corn to husking and butt-cutting equipment in large-end first orientation, and similarly it is desirable to feed husked ears of corn to a corn cutter machine in small-end first orientation. It is common to station workers at locations along a processing stream where they manually orient agriculture articles, but this is undesirable in view of the high cost and uncertain availability of labor. Among the various types of apparatus which have been developed to orient articles is that described in U.S. Pat. No. 3,394,805 issued July 30, 1968 to Edward E. Ross and Jack Cunningham. In the method and apparatus therein described husked ears of corn are segregated in common lengthwise orientation by spinning the ears about their longitudinal axes in elongated pockets moving over a belt so that the ears are caused to migrate to that side of the pockets in the direction of their smaller ends. For effective orientation to occur, the tapered ears should touch the orienter belt in at least two longitudinally spaced places of differing diameters. Where the articles have a relatively straight taper, good contact is made along the flat surface of the belt and orientation is carried out in the intended manner. However, where the articles have a curved taper, such as some varieties of corn (e.g. white corn or commercially available yellow corn), the orientation process is sluggish and ineffective because at any one instant the article only contacts the belt in one small area and as it spins it does not cock properly in the conveyor pocket for sideways migration. The need has thus been recognized to provide method and apparatus for orienting elongated tapered articles which will effectively operate upon articles having a taper curvature as well as articles of straight taper.

SUMMARY OF THE INVENTION AND OBJECTS

It is a general object of the invention to provide improved method and apparatus for orienting elongated articles having a taper which may be either straight or curved.

Another object is to provide improved method and apparatus of the type described in which elongated tapered articles are segregated as to lengthwise orientation by spinning the articles about their longitudinal axes above a special support surface which engages the articles in such a manner as to cause migration in a direction toward their small ends irrespective of taper curvature.

Another object is to provide a method and apparatus of the above character which is relatively simple in construction and operation, which will efficiently orient the products without the requirement for manual labor, and which will not cause physical injury or damage to the products.

The foregoing and additional objects and features of the invention are provided by a method and apparatus in which the infeed articles (e.g. ears of corn) are deposited in enclosures or pockets of a conveyor which moves the articles along a path over a surface so that the articles are caused to spin about their longitudinal axes. An upstanding or raised ridge is provided on the support surface and the ridge extends diagonally across the path of article movement so that an overlying spinning article engages the surface on at least two points or areas, i.e. a portion of the ridge and an adjacent portion of the planar surface. This support of the tapered article at longitudinally spaced points or areas having different diameters causes each article to cock in the conveyor enclosure and migrate in a direction toward its smaller end. The result is that articles of common lengthwise orientation are moved to either side of the planar surface where they are collected and conveyed away for further processing steps.

BRIEF DESCRIPTION OF THE DRAWINGS

FIG. 1 is a perspective view of an article orienting apparatus incorporating features of the invention;

FIG. 2 is a top plan view of the apparatus of FIG. 1;

FIG. 3 is an enlarged fragmentary sectional view taken along the length of a conveyor pocket showing one orienting phase of an exemplary ear of corn therein;

FIG. 4 is a fragmentary cross sectional view taken along the length of a conveyor pocket showing another orienting phase of the ear of corn therein.

DESCRIPTION OF THE PREFERRED EMBODIMENT

Referring to the drawings and particularly FIG. 1 one preferred form of apparatus adapted for carrying out the method of the invention is illustrated generally at 10. While orienting apparatus 10 will be explained in relation to handling elongated tapered agricultural products, such as husked ears of corn 12, carrots, or pineapples and the like, it is understood that the invention also has application in handling other elongated products or articles having a lengthwise taper from a large end toward a small end thereof.

Apparatus 10 comprises means defining a supporting surface 14 for supporting the articles during movement along a path from left-to-right when viewed in FIG. 2, and conveyor means 16 to move the articles over the surface with their longitudinal axes disposed generally transverse of the path. Article in-feed means such as the illustrated flighted conveyor 18 is provided to deliver articles of random lengthwise orientation to the conveyor, and article take-away means such as the illustrated first and second belt-type conveyors 20,22 is provided to receive articles of common lengthwise orientation from either side of conveyor 16 and to convey these articles to further processing steps, such as a corn-cutting machine where the articles are the illustrated husked ears of corn.

Supporting surface 14 comprises a substantially planar support 24 and a belt-type conveyor 26. Belt 28 of the conveyor is trained between rollers 30,32 and defines an upper reach 34 moving over support 24 along the path in a direction indicated at 35 opposite that of article movement. Suitable bracket means, not shown, is provided to hold support 24 in fixed position beneath the upper reach of belt 28. Means are provided forming an upstanding ridge 36 extending diagonally across the path of article movement. Ridge 36 is formed by securing an elongate rod 38 by means such as welding to the top surface of support 24 so that, when viewed in the plan of FIG. 2, the ridge diverges from a side of the support in the direction of article movement. Belt 34 is fabricated from a suitable elastomer material providing flexibility such that the belt distorts over rod 38 to form the ridge, as best illustrated in FIG. 4.

Conveyor 16 comprises an endless series of pockets or enclosures 40 elongated laterally of the path of article movement and adapted to move over supporting surface 14 in a direction indicated at 42 opposite that of belt upper reach 34. Pockets 40 are defined by laterally extending battens 44 interconnected for articulation by suitable linkage means and trained between a pair of upper conveyor rollers 46,48 and a third lower roller, not shown, with the conveyor powered by suitable drive means, not shown. The battens 44 are spaced apart with a width greater than the diameter of the large ends of the particular articles to be oriented so that these articles can assume a cocking relationship within the enclosures in a manner to be presently described. Where the articles are the illustrated husked ears of corn, the enclosure width would preferably be on the order of 3 inches.

Countermovement of the enclosures 40 relative to support surface 14 with articles 12 constrained in individual pockets imparts a spin to these articles about their longitudinal axes.

Where an article has a relatively straight taper it will contact the supporting surface at points or areas of differing diameters so that the article tends to move with its large end forward in the same manner that a tapered cone would tend to roll in an arc over a planar surface. When constrained within enclosures 40, the article will migrate sideways in a direction toward its small end. However, where an article has a convexly curved taper such as the article 12' of FIG. 3, contact with the flat portion of a supporting surface is generally made only at one point or area 50 so that the article is caused to spin about only one diameter and thus does not tend to cock forward and migrate sideways in the manner described.

FIG. 4 illustrates an article 12" which is moving over the supporting surface in the region of ridge 36. Article 12" spins with one end on the ridge so that it is supported generally at two areas or points, i.e. area or point 54 directly above the ridge and area or point 56 spaced from the ridge along the flat portion of belt 28. It will be realized that this two-point contact is effective irrespective of the curvature of taper. The contact of the spinning article at differing diameters causes the articles to cock forward in the enclosures. With the articles cocked forward in this manner they will tend to migrate sideways in a direction toward their small ends. Thus all articles having an orientation with their small ends directed toward one side of the conveyor will migrate in the enclosures to that side, while the remaining articles of opposite orientation will migrate to the other side.

While the preferred embodiment illustrates apparatus in which belt 34 of the supporting surface moves in a counter-direction to the enclosures of conveyor 16, it is understood that the invention contemplates apparatus in which the supporting surface is stationary. However, movement of belt 34 in the manner described herein provides a more efficient action in that greater relative motion between the enclosures and supporting surface results in the sideways migration of the articles occurring in a much shorter distance along the path of travel. Also, supporting surface 14 and conveyor 16 can be arranged along a path having a slight downward inclination along the direction of article movement. This imparts a gravital rolling action to the articles so that they are not forced up against the trailing surfaces of battens 44.

A cross conveyor 58 is provided to receive the randomly oriented articles from in-feed conveyor 18 and feed these articles to a side of enclosures 40 in advance of ridge 36. Conveyor 58 comprises an endless belt 60 trained between rollers 62,64 and having an upper reach disposed below the upper reach of enclosure conveyor 16 in article receiving relationship with the discharge end of in-feed conveyor 18. Suitable drive means, not shown, are provided to drive conveyor 58 so that upper reach 60 moves the articles which discharge from conveyor 18 to the upper end of the enclosures, as viewed in FIG. 2. Continued movement of the enclosures rolls these articles from conveyor 58 onto a fixed support plate 66 which is positioned below the upper reach of conveyor 16 between cross conveyor 58 and the forward end of roller 30 for conveyor 26. The articles are rolled by the enclosures over plate 66 and onto the upper side of surface 14 where they engage the advance end of ridge 36 for orientation in the manner described.

Articles discharging from supporting surface 14 with their small ends oriented to the upper end as viewed in FIG. 2 are rolled by conveyor 16 onto a fixed supporting plate 68 positioned below the downstream end of conveyor 16 and extending substantially one-half of the length of the enclosures. The downstream edge 70 of plate 68 extends adjacent the surface of conveyor roller 48 so that the enclosures carry these articles from plate 68 over the end of the roller. Those articles of opposite orientation, i.e. articles with their small ends oriented to the lower end as viewed in FIG. 2, migrate to the opposite ends of the enclosures where they are rolled onto a suitable cross conveyor means 72 comprising an endless belt 74 having an upper reach disposed below the downstream end of conveyor 16. Conveyor 72 is powered by suitable drive means, not shown, so that the upper reach of belt 74 moves the articles discharging from surface 14 to the end of the enclosures for abutting against the enclosure ends. Continued movement of conveyor 16 rolls the articles off the side edge of conveyor 72 and onto a flat support plate 76 co-extensive with plate 68 and extending between conveyor 72 and the surface of roller 48.

The commonly oriented articles discharging from the upper end of conveyor 16 drop onto first take-away conveyor 20 for movement in the direction indicated at 78 while those articles collected at the lower side of conveyor 16 drop onto take-away conveyor 22 where they move in the direction indicated at 80. These take-away conveyors are suitably arranged to convey the articles of common orientation for further processing such as for delivery to a corn cutter machine.

The use and operation of the method and apparatus of the invention is explained as follows for use in orienting husked ears of corn having a curved taper. In-feed conveyor 18 conveys the ears of corn received in random lengthwise orientation from a previous processing step, for example, a washing operation. Conveyor 18 is driven at a speed coordinated with the speed of conveyor 16 so that the ears are deposited one at a time onto cross-conveyor 16 within individual enclosures 40. As conveyor 40 starts the ears along the path in the direction indicated at 42 cross-conveyor 58 moves the ears lengthwise of the enclosures where they abut against the enclosure ends. Continued movement of conveyor 16 rolls the ears onto support plate 66 and from there onto belt 34 which is moving in an opposite direction indicated at 35. The enclosures 40 are of a width sufficient to constrain the ears for movement with their longitudinal axes substantially transverse of the path with the countermovement of the enclosures and underlying belt 34 imparting a spin to the ears. The spinning ears continue to advance so that an end thereof rides over a portion of ridge 36. Irrespective of the particular lengthwise orientation of each ear or the curvature of taper to the ear, contact with supporting surface 14 is made in at least two areas or points, i.e. at the ridge and at a spaced part of the flat portion of belt 34. Contact is thus made at different diameters of the ears so that the ear tends to cock with its large end forward within the enclosure and migrate sideways in the direction of its small end. Those ears with their small ends directed to the top side as viewed in FIG. 2 move over the ridge and tend to migrate in that direction to abut against the enclosure ends, while those ears of opposite orientation migrate in the opposite direction. Ears having the former orientation are rolled by conveyor 16 over support plate 68 and dropped from the conveyor onto take-away conveyor 20. Those ears of the latter orientation are rolled onto cross conveyor 72 which further operates to move the ears to abut against the enclosure ends, and continued movement of conveyor 16 rolls the ears from the cross conveyor onto support plate 76 and over the conveyor end where they drop onto take-away conveyor 22. The take-away conveyors operate to convey the ears to the subsequent processing equipment.

It will be realized from the foregoing that the method and apparatus of the invention is effective to orient elongate tapered articles with a high degree of efficiency irrespective of whether the articles have a straight or curved taper.

While the foregoing embodiment is at present considered to be preferred it is understood that numerous variations and modifications may be made therein by those skilled in the art and it is intended to cover all such variations and modifications as fall within the spirit and scope of the invention as expressed in the appended claims.

I claim:

1. A method of handling elongated articles to effect lengthwise orientation of the same, the articles being characterized by having a lengthwise taper from a large end toward a small end thereof, the steps of moving the articles in random orientation along a path over a supporting surface having an upwardly extending ridge projecting diagonally across said path, constraining the articles whereby their longitudinal axes are maintained generally transverse of the path, said movement serving to effect a spin to the articles about their axes, movement of said spinning articles along said path serving to move the same over said ridge to cause each article to be supported at points of differing diameters whereby the articles are caused to migrate laterally of the path in a direction toward respective small ends of each article to segregate articles having common lengthwise orientation, irrespective of whether or not the article has a curved taper.

2. A method as in claim 1 in which each of the articles are constrained in individual enclosures elongated laterally of said path and the enclosures and respective articles are moved along said path over said surface.

3. A method as in claim 2 in which the supporting surface is moved in a direction opposite of the direction of movement of said enclosures.

4. The method of claim 3 in which the diagonal ridge is in a fixed position and in which the surface is formed by a belt that is flexed to form the ridge.

5. A method of handling elongated articles to effect lengthwise orientation of the same by employing apparatus characterized by a generally planar supporting surface including an upstanding ridge extending diagonally along a path with a flexible belt adapted to move over the surface and artical conveyor means including a series of elongated enclosures adapted to move over the belt and support surface, the method including the steps of depositing the articles in random lengthwise orientation into individual enclosures with the longitudinal axes of the articles disposed generally transverse of the path, moving the enclosures relative to the belt whereby the articles are caused to spin about their longitudinal axes and contact spaced points or areas of the belt over the ridge and planar surface with endwise migration of the articles toward one or the other side of the path depending upon their orientation.

6. In apparatus for handling elongated articles having a lengthwise taper from a large end toward a small end thereof, the combination including means forming a supporting surface for supporting the articles during movement along a path, the surface having an upstanding ridge extending diagonally of the direction of article movement along the path, conveyor means to move the articles over the surface with the longitudinal axes of the articles disposed generally transverse of the path whereby the articles contact spaced points or areas of said ridge and the surface to cause the articles to spin about their longitudinal axes with endwise migration toward one or the other side of the path depending upon their orientation.

7. The apparatus of claim 6 in which the conveyor means comprises a plurality of elongated enclosures adapted to move in series over the surface, each enclosure constraining an article therein to impart said spinning motion thereto, the enclosures having a width greater than the diameter of the large end of the articles to permit the articles to cock therein.

8. The apparatus of claim 6 in which the means for forming said surface includes a support, and an elongate member secured to the upper side of said support and extending diagonally across said path.

9. The apparatus of claim 6 wherein said means for forming said surface includes a flexible conveyor belt having an upper reach moving along said path, and ridge forming means underlying said upper reach and serving to impart said ridge by distortion of the belt.

10. The apparatus of claim 9 in which the conveyor means includes a plurality of laterally elongate enclosures arranged in series and adapted to loosely constrain respective articles therein for movement over said surface in a direction opposite to the movement of the belt upper reach.

11. The apparatus of claim 10 in which said ridge extends diagonally across said path from one side of the belt, together with additional means for feeding the articles into the conveyor enclosures in advance of the ridge.

12. The apparatus of claim 11 together with cross conveyor means having an upper reach disposed to receive articles from the additional means and to move these articles to said one side of the belt.

13. The apparatus of claim 6 and including first means to receive commonly oriented articles discharging from one side of the surface, and second means to receive commonly oriented articles discharging from the other side of said surface.

* * * * *